March 3, 1953
G. B. PARSONS
2,630,230
UNIVERSAL COUPLER
Filed March 13, 1947
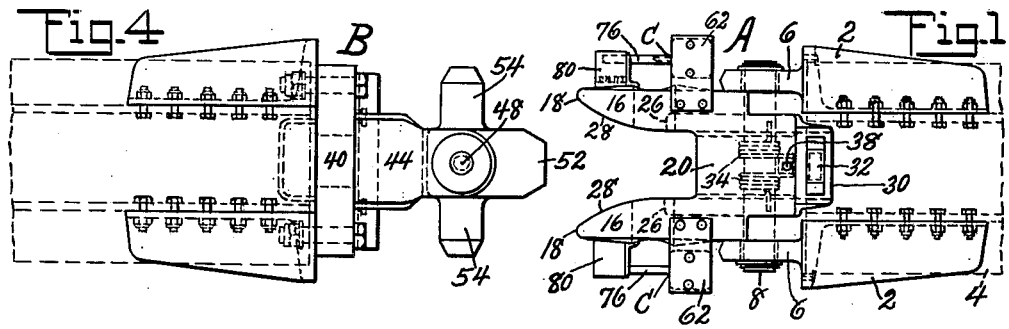
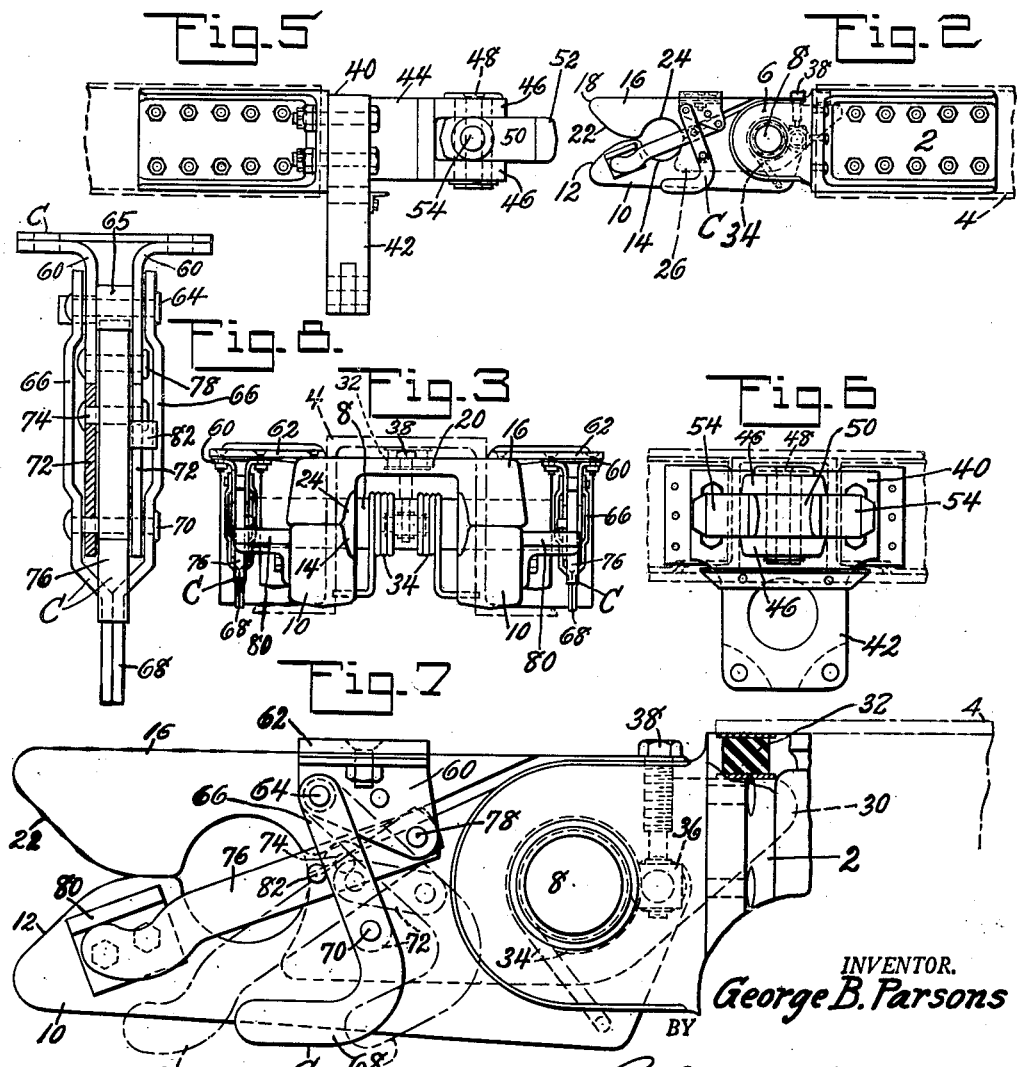
INVENTOR.
George B. Parsons
BY
Robert A. Shields
Attorney Patented Mar. 3, 1953

2,630,230

UNITED STATES PATENT OFFICE 2,630,230

UNIVERSAL COUPLER

George B. Parsons, Roosevelt, N. Y., assignor to American Car and Foundry Company, New York, N. Y., a corporation of New Jersey Application March 13, 1947, Serial No. 734,465

13 Claims. (Cl. 213—177)

1

This invention relates to couplers in general and in particular to couplers for use with light weight type of passenger cars or industrial cars or trucks.

The majority of the couplers used in railway car service have relatively large engaging faces which together with the coupler carriers, etc., will transmit considerable strain from one car body to the other but cannot transmit side thrusts. It is, of course, advisable to prevent the transmission through the couplers of vertically acting forces between the car bodies and accordingly it is an object of the present invention to provide a coupler between cars which is so constructed and arranged as to prevent transmission of any vertically acting forces other than draft and buff.

A further object of the invention is the provision of a coupler having its parts so arranged as to give substantially universal motion between the car bodies.

A still further object of the invention is the provision of a car coupler having opposed jaws or hook portions pivotally mounted on a car and carrying lock means preventing separating movement of the hooks.

A yet further object of the invention is the provision of a car coupler having its parts so arranged as to transmit side thrusts from one car to the other while permitting relative swiveling between the cars.

These and other objects of the invention will be apparent to persons skilled in the art from a study of the following description and accompanying drawings, in which Fig. 1 is a plan view of the coupler as applied to one car;

Fig. 2 is a side elevational view of the coupler of Fig. 1;

Fig. 3 is an end elevational view of this coupler part;

Fig. 4 is a plan view of the mating coupler part attached to the end of an adjacent car and adapted to cooperate with the coupler part of Fig. 1;

Fig. 5 is a side elevational view of the coupler part of Fig. 4;

Fig. 6 is an end elevational view of this coupler part;

Fig. 7 is an enlarged side elevational view of the coupler part of Fig. 1, and

Fig. 8 is an enlarged end view of the lock mechanism.

Referring now to the drawings in detail it will be seen that the coupler is made of three main parts, one part A comprising the hook members and being attached to one car body, while the other part B is attached to the adjacent car body with the hook members of part A locked against movement by the lock structure C. The coupler part A is formed with a base portion 2 adapted to be attached to the center sills 4 of the one car body and this base portion is provided with spaced ears 6 through which is extended a substantially horizontal pivot pin 8. Pivotally mounted on the pivot pin 8 is a pair of upwardly facing hooks 10 which taken together may be considered as a lower coupler jaw. These upwardly facing hooks are provided with an inclined approach surface 12 and with a semi-circular engaging surface 14 adapted to engage and retain a bar member on the coupler half B. Pivotally mounted on the pivot pin 8 between the spaced hooks 10 is an upper jaw member 16. This upper jaw is provided with spaced downwardly facing hooks 18 rigidly connected by a bridge portion 20. The hook portions of this upper jaw member are provided with inclined approach surfaces 22 and semi-circular bar engaging portions 24 and also with a projecting fin or rib 26 which is adapted to transmit buffing shock between the cars and also to assist in the coupling of the cars when pushed together. Both the upwardly facing hooks 10 and downwardly facing hooks 18 have their inner surfaces curved as at 28 to assist in coupling of the cars when on a slight curve. In order to hold the upper coupler jaw in a substantially horizontal position the bridge portion 20 is extended rearwardly as at 30 and adapted to engage a rubber or other resilient block 32. This resilient block will, of course, permit slight rotation of the upper coupler jaw downwardly about the pivot pin 8 from the position shown in Figs. 2 and 7. In order to hold the upper and lower hook portions in engagement torsion springs 34 are applied on pivot pin 8 and have their outer ends engaging the spaced hooks 10, while their inner ends are connected by a block 36, the position of which can be adjusted by means of an adjusting screw 38 carried by the bridge portion 20. Since these torsion springs engage only with the hook or jaw portions, it is obvious that the tension will not be modified in any way by rotation of the jaws about the pivot rod 8. The tension of the springs will be adjusted so as to properly hold the upwardly and downwardly faced hooks in engagement as shown in Fig. 7.

The coupler part B shown in Figs. 4, 5, and 6 consists of a base portion 40 adapted to be secured to the center sills of an adjacent car and as shown this base portion is provided with an extension 42 adapted to receive sway control devices fully described in copending application, Serial No. 733,096, filed March 7, 1947. Projecting outwardly from the base portion 40 is a shank 44 terminating in vertically spaced jaws 46. These jaws are adapted to receive a vertically disposed pivot pin 48 extending through the jaws and through a T shaped member 50. This T shaped member has its leg 52 projecting forwardly and adapted to engage between the spaced hooks of the coupler part A. The arms 54 of the T-shaped member are substantially round and are adapted to be closely engaged by the curved surfaces 14 and 24 of the hook portions of part A. These round portions 54 correspond to a cross bar having its axis substantially at right angles to the axis of vertical pin 48. Since the T-shaped member may rotate in a horizontal plane about pin 48 and the coupler parts may rotate relative to each other about the bar portions 54 as well as about the pivot 8, it will be seen that an extremely flexible coupling is provided having substantially universal motion. Due to the spacing of arms 54 and their engagement by the spaced hooks of part A together with the projection of tongue 52 between the jaws of part A any side thrust of one car will be transmitted to the other car.

In order to hold the jaws or hooks of part A in locked position the locks C are provided carried wholly by the jaw members. As best shown in Figs. 1, 2, 3, 7 and 8 the lock device C is duplicated on either side of the coupler part and each consists of a mounting bracket portion 60 riveted or otherwise secured to the upper jaw by means of a plate 62. The bracket portions 60 are pierced to receive a pivot pin 64 extending through the bracket portions, through a spacer 65 and through the upper ends of spaced operating arms 66. These operating arms are bent as best shown in Fig. 8 to clear the lock linkage and have their lower ends bent inwardly and joined to provide an operating handle portion 68. The operating links or levers are pierced to receive a pivot pin 70 adapted to extend through the links and through the lower ends of strut links 72. The upper ends of these strut links 72 are pierced to receive a pivot pin 74 which extends through the strut links and through a hole in the intermediate portion of a coupler control or lock link 76. The upper or inner end of the lock link 76 is pivoted on a pin 78 extending through the bracket 60 which, as previously stated, is carried by the upper coupler jaw. The lower or outer end of lock link 76 bears beneath the outwardly directed ledge 80 of an angle shaped member rigidly attached to the upwardly facing hook 10. The control or lock link is also provided with a stop 82 adapted to limit outward or forward motion of the operating linkage or lever 66. With the parts shown in locked position, as given in full line of Fig. 7, the pivot axes of pins 64, 70 and 74 are substantially in alignment or on dead center and accordingly there can be no motion of lock link 76 and without movement of the lock lever there can be no downward motion of hook 10 independently of the upper coupler jaw. Likewise there can be no upward independent motion of the upper coupler jaw with respect to the lower hooks or jaws. Thus the hooks are locked in their full line position of Fig. 7. When it is desired to unlock the coupler the operating links or levers 68 will be moved to the line and dash position of Fig. 7 thus breaking the toggle lock and swinging the lock link 76 to the line and dash position. Such a position will permit the lower hook to be moved downwardly or, in case the tension on springs 34 is properly adjusted, the lower jaws or hooks 10 will drop downwardly and ledge 80 will remain in engagement with the lock link 76. While the lock devices have been shown as wholly independent of each other, it is obvious that they could readily be interconnected, for example, by extending the pivot pin 64 through the upper jaw or the same locking action could be obtained by integrally connecting the lower independent hooks or jaws 10.

While the coupler has been described more or less in detail with specific reference to the figures, it will be obvious that various modifications and rearrangements of parts other than those described may be made and all such modifications and rearrangements are contemplated as will fall within the scope of the appended claims.

What is claimed is:

1. In a coupler, the combination of a substantially horizontal pivot rod, an upper jaw pivoted thereon for vertical swinging movement, means limiting the downward swinging movement of the upper jaw, a lower jaw pivoted on said pivot rod for vertical swinging movement, and means encircling said pivot rod and bearing on said jaws to normally hold the same in engagement.

2. In a coupler, the combination of a substantially horizontal pivot rod, an upper jaw pivoted thereon for vertical swinging movement, means limiting the downward swinging movement of the upper jaw, a lower jaw pivoted on said pivot rod for vertical swinging movement, and means encircling said pivot rod and bearing on said jaws to normally hold the same in engagement, the first said means comprising a rubber block bearing on a portion of the upper jaw.

3. In a coupler, the combination of a substantially horizontal pivot rod, an upper jaw pivoted thereon for vertical swinging movement and including a pair of spaced downwardly facing hooks adapted to engage the ends of a horizontally extending bar of a mating coupler, a pair of spaced upwardly facing hooks pivoted on said pivot rod for vertical swinging movement, and resilient means located in the space between said pairs of hooks and anchored on said upper jaw and engaging said last named pair of hooks to constantly urge the same into engagement with the hooks of the upper jaw.

4. The construction of claim 3 characterized in that toggle lock levers are carried by said upper jaw and engage at least one of said upwardly facing hooks to lock the hooks in engagement.

5. In a coupler, the combination of a substantially horizontal pivot rod, an upper jaw pivoted thereon for vertical swinging movement and including a pair of spaced downwardly facing hooks adapted to engage the ends of a horizontally extending bar of a mating coupler, a pair of spaced upwardly facing hooks pivoted on said pivot rod for vertical swinging movement, and means interconnecting said upwardly and downwardly facing hooks to control the movements thereof and lock the same in bar engaging position.

6. In a coupler, the combination of a substantially horizontal pivot rod, an upper jaw pivoted thereon for vertical swinging movement and including a pair of spaced downwardly facing hooks adapted to engage the ends of a horizontally extending bar of a mating coupler, a pair of spaced upwardly facing hooks pivoted on said pivot rod for vertical swinging movement, and independent toggle lever devices carried by said upper jaw and each engaging an upwardly facing hook to independently control the movement thereof.

7. In a coupler, the combination of a substantially horizontal pivot rod, an upper jaw pivoted thereon for vertical swinging movement and including a pair of spaced downwardly facing hooks adapted to engage a bar of a mating coupler, a pair of spaced upwardly facing hooks pivoted on said pivot rod for vertical swinging movement, and independent toggle lever devices carried by said upper jaw and each engaging an upwardly facing hook to independently control the movement thereof, said toggle lever devices comprising a toggle lock movable to a dead center position preventing separating movement between the hooks.

8. In a coupler, the combination of a pair of relatively movable jaws adapted to grip a mating member, and lock means pivotally connected to and carried wholly by one of said jaws and having a portion free of connection to but bearing on the other jaw to prevent relative separating movement between the jaws.

9. In a coupler, the combination of a pair of relatively movable jaws adapted to grip a mating member, and lock means carried wholly by one of said jaws and having a portion free of connection with but bearing on the other jaw to prevent relative separating movement between the jaws, said lock means comprising toggle levers movable to a dead center position when in locked position.

10. A car coupler comprising a pair of coupling heads of different construction, each head comprising a base portion adapted to be connected to a car body, vertically swingable jaw members pivotally connected to one base portion for swinging movement about a substantially horizontal axis, and a horizontally swingable bar member pivotally connected to the other base portion for limited swinging movement about a substantially vertical axis, said bar member being T-shaped in plan and having the arms thereof engageable by said jaw members and the leg thereof projecting outwardly away from said other base portion.

11. A car coupler comprising a pair of coupling heads of different construction, each head comprising a base portion adapted to be connected to a car body, vertically swingable jaw members pivotally connected to one base portion for swinging movement about a substantially horizontal axis, and a horizontally swingable bar member pivotally connected to the other base portion for limited swinging movement about a substantially vertical axis, said jaw members and bar member being so constructed and arranged as to have mutual coupling engagement and pivotal connection on a horizontal axis substantially intersecting said vertical axis whereby limited universal movement is provided between the coupler heads.

12. A car coupler comprising a pair of coupling heads of different construction, each head comprising a base portion adapted to be connected to a car body, vertically swingable jaw members pivotally connected to one base portion for swinging movement about a substantially horizontal axis, and a horizontally swingable bar member pivotally connected to the other base portion for limited swinging movement about a substantially vertical axis, said jaw members and bar member being so constructed and arranged as to have mutual coupling engagement at horizontally spaced points whereby side thrusts may be transmitted between said base portions.

13. A car coupler comprising a pair of coupling heads of different construction, each head comprising a base portion adapted to be connected to a car body, spaced apart vertically swingable jaw members pivotally connected to one base portion for swinging movement about a substantially horizontal axis, and a horizontally swingable bar member pivotally connected to the other base portion for limited swinging movement about a substantially vertical axis, said bar member having a forwardly extending projection adapted to enter the space between said swingable jaw members, and said swingable jaw members being adapted to engage said bar member to couple said heads together, said jaw members, bar member and forward projection cooperating to transmit side thrusts between said base portions.

GEORGE B. PARSONS.

REFERENCES CITED

The following references are of record in the file of this patent:

UNITED STATES PATENTS

| Number | Name | Date |
|---|---|---|
| 236,447 | McKirahan | Jan. 11, 1881 |
| 418,238 | Shaw | Dec. 31, 1889 |
| 1,262,456 | Colwell | Apr. 9, 1918 |
| 1,352,516 | Kalata | Sept. 14, 1920 |
| 1,650,838 | Jensen | Nov. 29, 1927 |
| 1,665,817 | Morton | Apr. 10, 1928 |
| 1,776,979 | Paradis et al. | Sept. 30, 1930 |
| 2,100,080 | Lackinger | Nov. 23, 1937 |
| 2,124,467 | Lyman | July 19, 1938 |
| 2,148,580 | Reid | Feb. 28, 1939 |
| 2,517,168 | Bennek | Aug. 1, 1950 |

FOREIGN PATENTS

| Number | Country | Date |
|---|---|---|
| 180,168 | Canada | May 23, 1917 |
| 58,860 | Germany | Sept. 16, 1891 |